April 15, 1952  W. L. SNAPPS  2,592,967
FISHING SINKER
Filed Oct. 25, 1950
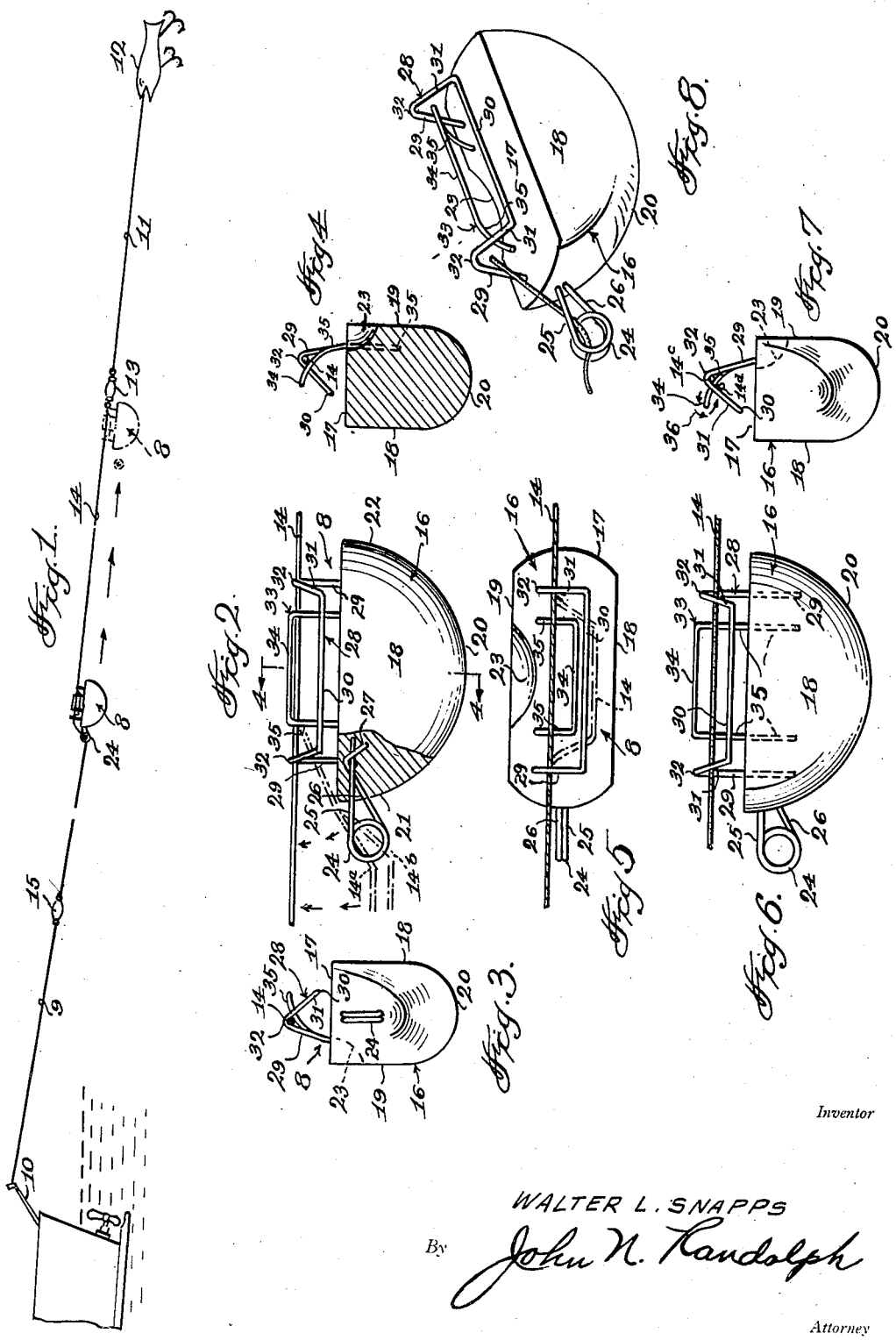
Inventor
WALTER L. SNAPPS
By John N. Randolph
Attorney Patented Apr. 15, 1952

2,592,967

UNITED STATES PATENT OFFICE 2,592,967

FISHING SINKER

Walter L. Snapps, Neah Bay, Wash.

Application October 25, 1950, Serial No. 192,126

5 Claims. (Cl. 43—44.88)

1

This invention relates to a novel fishing sinker especially adapted for use in trolling for large game fish such as salmon and which is so constructed that the sinker may be adjustably anchored to the fishing line at any desired distance above a leader swivel in a manner to permit it to be released when a fish strikes so that the sinker will thereafter slide downwardly along the line to the leader swivel to enable the line to be substantially reeled in before the sinker reaches the reel tip.

Another object of the invention is to provide a sinker which may likewise be mounted in a fixed position on a fishing line and so that it will not be released for sliding movement relatively thereto by a strike.

Another novel and important object of the present invention is to provide a fishing sinker which may be so mounted on a fishing line in any desired position with respect thereto for trolling and which will be released by a strike to slide toward the leader swivel and which may be flipped from the line by a flipping motion of the rod and before the line has been reeled in sufficiently to bring the sinker into proximity to the rod to thereby leave the line unhampered so that the fisherman may enjoy the full play of the fish.

A further object of the invention and the primary object thereof is to provide a sinker of the aforedescribed character which may be mounted on a fishing line to maintain either a fixed position with respect thereto or to slide downwardly on the line after a strike and which is so disposed that the sinker may be quickly and easily disengaged from the line by the use of one hand as it approaches the rod tip thereby leaving the line unhampered and so that the fish may thereafter be played without danger of the lure being torn from the fish's mouth by the weight of the sinker.

The present invention is primarily intended and adapted for use in trolling for salmon where it is frequently necessary to use sinkers weighing as much as 14 oz. or 16 oz. in order to troll at a sufficient depth. Usually after hooking a salmon it is possible to nearly reel the salmon in after the first run is made by the fish and before the fish commences its second run. Accordingly, with the novel sinker comprising this invention, when the salmon is substantially reeled in after the first run the sinker may be quickly "thumbed off" the line with the use of one hand thereby leaving the line unhampered for subsequent runs made by the fish and which may include two or three additional runs and so that the fisherman may thereafter reel the line in at the end of the

2 last run sufficiently so that the fish can be readily boated.

Various other objects and advantages of the invention will hereinafter become more fully apparent from the following description of the drawing, illustrating a presently preferred embodiment thereof, and wherein:

Figure 1 is a fragmentary side elevational view showing a conventional fishing rig normally employed in trolling for salmon and with the novel sinker shown applied thereto;

Figure 2 is an enlarged side elevational view, partly in section showing the sinker with a line applied thereto and in a position to permit the sinker to slide readily thereon and showing the line in dotted lines in one position releasably engaged by the sinker and in another position nonreleasably engaged thereby;

Figure 3 is a front end elevational view of the sinker with the line applied thereto and looking from left to right of Figure 2;

Figure 4 is a cross sectional view of the sinker taken substantially along a plane as indicated by the line 4—4 of Figure 2;

Figure 5 is a top plan view of the sinker;

Figure 6 is a side elevational view thereof similar to Figure 2 but showing the sinker engaging the line in a different manner to permit the sinker to be flipped from the line while playing a fish;

Figure 7 is a rear end elevational view of the sinker showing the line in two different positions with respect thereto; and Figure 8 is a perspective view of the sinker.

Referring more specifically to the drawing for the purpose of illustrating the various applications and use of the novel fishing sinker, designated generally 8 and comprising the invention, a fishing rig such as is utilized for salmon fishing is illustrated in Fig. 1 and includes preferably a wire fishing line 9 which extends from a reel, not shown, of a fishing rod 10. The fishing rig also includes a wire leader 11 to the outer end of which is attached a lure 12 and which is provided at its inner end with a small leader swivel 13 to which is attached one end of a length of cuttyhunk or similar fishing line 14, the opposite end of which is attached by a small upper swivel 15 to the lower outer end of the wire line 9. Obviously, if desired, in lieu of the wire 9 an entire line of cuttyhunk or its equivalent could be employed and in which case the upper swivel 15 could be omitted.

The novel fishing sinker 8 comprising the invention and which is primarily intended for use in trolling for salmon and other large game fish comprises an elongated body, designated generally 16 and which is preferably formed of lead and which may vary in size and weight up to a weight of as much as 16 oz. The sinker body 16 preferably has a substantially flat top surface 17, substantially flat parallel side walls 18 and 19 and a convexly rounded continuous bottom and ends 20 which is preferably substantially semi-circular, viewing the sinker from either side thereof, as seen in Figures 2 and 6. Accordingly, the rounded portion 20 constitutes not only the bottom of the sinker body but likewise its front end 21 and its rear end 22 since said rounded portion extends to and merges with the ends of the top surface 17. Further, the rounded bottom and end portions are likewise rounded transversely, as seen in Figures 3, 4, 7 and 8 to merge with the sides 18 and 19.

The side 19, constituting the left side of the sinker body 16 looking from front to rear thereof, is also provided with a recess 23 formed in the sinker body intermediate of its ends and which is partially formed in the side wall 19 and partially in the top surface 17, as clearly illustrated in Figures 4 and 5 for an important purpose, which will hereinafter be described and which performs a material function greatly increasing the utility of the sinker 8 and enabling it to be much more quickly disengaged from the line 14 than is possible with other sinkers intended to be used for the same purpose.

The sinker 8 is provided with a line engaging spring coil 24 which is disposed in advance of the forward end 21 of the sinker body and which is formed from the intermediate portion of a single strand of spring wire and composed of two convolutions which are normally disposed yieldably in side-by-side relationship and abutting engagement. One end 25 of said wire strand extends rearwardly from the top of the spring coil 24 and from one side thereof and the other end 26 extends upwardly and rearwardly from the opposite side of the bottom portion of the spring coil 24 and has its terminal 27 engaged over the end 25. The terminal portions of the ends 25 and 26 are embedded and anchored in the forward part of the sinker body 16 for positioning the spring coil 24 forwardly of the end 21, as clearly illustrated in Figures 2 and 8.

A line engaging member, designated generally 28, preferably comprises a strand of relatively heavy gauge and substantially rigid wire having substantially parallel corresponding end portions 29 which are embedded in substantially upright positions in the sinker body 16 and which project upwardly from the top surface 17, adjacent the left side 19 and which are inclined slightly upwardly and away from said side 19. Said end portions 29 are disposed adjacent the ends 21 and 22 of the sinker body and beyond the ends of the groove 23. The strand 28 includes a substantially straight intermediate portion 30 which is disposed above and substantially parallel to the top surface 17 and longitudinally thereof and adjacent the side 18. Said strand 28 also includes complementary portions 31 which project from the ends of said intermediate portion 30 in diverging relationship and which extend upwardly in converging relationship to the upper portions of the ends 29 with which said portions 31 merge to form downwardly opening substantially V-shaped portions having rounded longitudinally aligned bight portions 32 for slidably engaging the line 14.

A line retaining member, designated generally 33 comprises a relatively heavy gauge strand of wire having a substantially straight intermediate portion 34 which is shorter than the straight intermediate portion 30 and which is disposed substantially thereabove and longitudinally of the sinker body 16. The strand forming the line retainer 33 is provided with complementary downwardly extending curved portions 35 which extend from the ends of said intermediate portion 34 downwardly toward the top surface 17 and generally toward the side 19 and which extends into the sinker body 16, substantially in alignment with the ends 29 and have terminal portions thereof anchored in said sinker body, as illustrated in dotted lines in Figures 2 and 6. Said intermediate portion 34 is disposed substantially at the same level as the bight portions 32 and is laterally offset with respect thereto, as clearly illustrated in Figures 3, 4 and 7.

The sinker 8 is applied to the length of cuttyhunk 14 by passing a portion thereof under the intermediate portion 30 of the guide member 28 and then over the intermediate portion 34 of the line retaining member 33 so that spaced portions of the line 14 will engage in the downwardly opening bight portions 32 and will be held against disengagement therefrom by other portions of the line engaging the upper, convex edges of the ends 35, as clearly illustrated in Figure 4. With the sinker 8 thus mounted on the line 14, it will be readily apparent that said sinker is free to slide relatively to the line and accordingly will normally move toward its lower end or toward the leader swivel 13. The sinker 8 may be adjustably and releasably anchored at a predetermined point along the line 14 by engaging a portion of said line between the upper portions of the spring convolutions or jaws 24 as illustrated at 14a in Figure 2 so that the sinker 8 will be held against sliding movement relatively to the line 14 and may be positioned at any desired distance above the leader swivel 13. With the sinker thus disposed and with the rig used for trolling, when a fish strikes the lure 12 the sudden pull on the fishing line will cause the line 14 to be jerked out of engagement between the jaws or spring convolutions 24 since the drag on the line at the rod 10 will resist the pull of the strike so that the pull above the sinker 8 will be initially on the portion of the line engaged between the spring jaws 24. Accordingly, the sinker 8 may then slide downwardly until it is stopped by engagement with the leader swivel 13 and the fish may be played and reeled in and the swivel 15 is sufficiently small to pass through the rod guide so that the line can be reeled in up to the sinker 8. When this occurs after the first run of the fish and before commencement of the second run, the fisherman may hold the rod with one hand and by placing his thumb in the recess 23 and engage the thumb with the line 14 which is in the position as illustrated at 14c in Figure 7 and by sliding his thumb upwardly toward the retainer portion 34, may thumb the line over the line retainer 33 as illustrated by the arrows 36 in Figure 7 to cause the line to then assume the position as indicated at 14d in Figure 7, beneath the retainer 33 so that the sinker 8 may be quickly and easily disengaged from the line 14 by lifting it and moving it laterally to the right as seen in Figure 7, thereby enabling the sinker to be quickly and easily removed with the use of one hand and while the fish is held by the rod with the other hand. Thereafter, the fisherman is free to play the fish on subsequent runs without being hampered by the sinker and without danger of the lure being torn out of the fish's mouth by the weight of the sinker.

If the fisherman desires to maintain the sinker 8 in a predetermined position on the line 14 and so that it will not be released to slide relatively thereto when a fish strikes the lure 12, this can be accomplished by attaching the line 14 to the spring jaws in the manner as illustrated at 14b in Figure 2, instead of as previously described and as illustrated at 14a. In the position of 14b, the line is engaged between the jaws or convolutions 24 from beneath said jaws and in this position can only be disengaged therefrom by being pulled downwardly and away from the convolutions 24 so that a pull on the line 14 from the swivel end 15 could not disengage the line from the jaws or convolutions 24 thus assuring that the sinker will be maintained on the line in the position in which it is applied.

The line may also be initially engaged with the members 28 and 33, as illustrated at 14d in Figure 7 after which another portion of the line is engaged by the jaws 24 in its initial position of 14a. As previously described, when a fish strikes the lure the line 14 will be disengaged from the jaws 24 to slide downwardly to its dotted line position of Figure 1 in which position the sinker may be flipped from the line by a quick lateral jerk of the rod 10. However, in this manner of use the sinker will be lost but will afford the fisherman an opportunity to fully play the fish from the beginning without being hampered by the weight of the sinker.

Various modifications and changes are contemplated and may obviously be resorted to, without departing from the spirit or scope of the invention as hereinafter defined by the appended claims.

I claim as my invention:

1. A fishing sinker comprising an elongated sinker body having a top surface, a fish line engaging member having end portions anchored in the sinker body and including complementary, longitudinally spaced downwardly opening substantially inverted V-shaped portions disposed above the top surface of the sinker body and adapted to slidably engage a fishing line, said inverted V-shaped portions each including a leg terminating above and spaced from the top surface of the sinker body and adapted to provide therewith a passage for applying the fishing line to or removing it from the inverted V-shaped portions, and a line retaining member anchored in the sinker body and having corresponding curved legs extending upwardly therefrom across said inverted V-shaped portions and terminating adjacent the level of the top thereof and laterally spaced therefrom for releasably retaining the line in engagement with the downwardly opening inverted V-shaped portions for sliding movement with respect to the sinker.

2. A fishing sinker as in claim 1, said upwardly extending curved portions of the line retaining member being disposed between and spaced from said inverted V-shaped portions.

3. A fishing sinker as in claim 1, said upwardly extending curved portions of the line retaining member being disposed between and spaced from said inverted V-shaped portions, said line engaging member comprising a single strand of wire additionally including a substantially straight intermediate portion extending between and merging with complementary legs of the inverted V-shaped portions and disposed above and spaced from the top surface of the sinker body.

4. A fishing sinker as in claim 1, said upwardly extending curved portions of the line retaining member being disposed between and spaced from said inverted V-shaped portions, said line engaging member comprising a single strand of wire additionally including a substantially straight intermediate portion extending between and merging with the complementary legs of the inverted V-shaped portions and disposed above and spaced from the sinker body top surface, and said line retaining member being formed of a single strand of wire and including a substantially straight intermediate portion disposed above the sinker body and merging at its ends with the upper ends of said upwardly curved portions of the line retaining member, said intermediate portion of the line retaining member being disposed substantially above the intermediate portion of the line engaging member.

5. A fishing sinker as in claim 1, said upwardly extending curved portions of the line retaining member being disposed between and spaced from said inverted V-shaped portions, said sinker body having a substantially upright side wall, said upwardly curved portions of the line retainer being curved in a direction away from said side wall, and said side wall and top surface having a common thumb receiving recess disposed between the upwardly curved line retainer portions adapted to receive the thumb for engaging the line between said line retainer portions for displacing the line laterally over the upper, outer ends thereof for releasing the line from the retaining member.

WALTER L. SNAPPS.

REFERENCES CITED

The following references are of record in the file of this patent:

UNITED STATES PATENTS

| Number | Name | Date |
| --- | --- | --- |
| 2,135,847 | Rosenquist | Nov. 8, 1938 |
| 2,257,415 | Gerdin | Sept. 30, 1941 |
| 2,399,298 | Sevegny | Apr. 30, 1946 |
| 2,470,995 | Lesser | May 24, 1949 |